United States Patent
Duda

(10) Patent No.: US 10,536,297 B2
(45) Date of Patent: Jan. 14, 2020

(54) INDIRECT VXLAN BRIDGING

(71) Applicant: Arista Networks, Inc., Santa Clara, CA (US)

(72) Inventor: Kenneth James Duda, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 157 days.

(21) Appl. No.: 15/084,017

(22) Filed: Mar. 29, 2016

(65) Prior Publication Data
US 2017/0289031 A1   Oct. 5, 2017

(51) Int. Cl.
*H04L 12/46*   (2006.01)

(52) U.S. Cl.
CPC .................... *H04L 12/4641* (2013.01)

(58) Field of Classification Search
CPC ... H04L 12/4633; H04L 49/354; H04L 45/74; H04L 12/4641
See application file for complete search history.

(56) References Cited

U.S. PATENT DOCUMENTS

| | | | |
|---|---|---|---|
| 6,904,466 B1* | 6/2005 | Ishiyama | H04L 63/164 709/207 |
| 2014/0092907 A1* | 4/2014 | Sridhar | H04L 45/74 370/392 |
| 2014/0348166 A1* | 11/2014 | Yang | H04L 45/124 370/392 |
| 2014/0372582 A1* | 12/2014 | Ghanwani | H04L 45/64 709/223 |
| 2015/0009992 A1* | 1/2015 | Zhang | H04L 49/354 370/392 |
| 2015/0124629 A1* | 5/2015 | Pani | H04L 12/18 370/248 |
| 2016/0285761 A1* | 9/2016 | Dong | H04L 12/4666 |
| 2017/0244572 A1* | 8/2017 | Kuwata | H04L 12/184 |

OTHER PUBLICATIONS

Mahalingam, M. et al., "Virtual Extensible Local Area Network (VXLAN): A Framework for Overlaying Virtualized Layer 2 Networks over Layer 3 Networks", retrieved at http://tools.ietf.org/html/rfc7348, Aug. 2014 (22 pages).

\* cited by examiner

*Primary Examiner* — Andrew Lai
*Assistant Examiner* — Chuong M Nguyen
(74) *Attorney, Agent, or Firm* — Chamberlain, Hrdlicka, White, Williams & Aughtry

(57) ABSTRACT

A method for transmitting MAC frames between hosts/remote machines and virtual machines across network elements (e.g., switches, routers, and multilayer switches) that conventionally do not hold capacity to address VXLAN encapsulation to any and all possible destination VTEPs within expanding data centers. More specifically, the method permits a network element the functionality of retaining VXLAN encapsulation table entries corresponding to VTEPs on Top of Rack (ToR) switches versus to VTEPs on hosts that reside under those ToR switches. This use of indirect VXLAN bridging may reduce the number of required VTEPs stored on a network element for the purposes of performing VXLAN encapsulation, thereby once again establishing the capability for packets to reach any arbitrary destination VTEP as data centers scale.

16 Claims, 12 Drawing Sheets

INDIRECT VXLAN BRIDGING

BACKGROUND

Found on hosts and network elements such as routers and multilayer switches, virtual tunnel end points (VTEPs) tend to require storage of other (remote) VTEP IP addresses in order to encapsulate and deliver packets to a vast number of egresses at or near potential destinations.

SUMMARY

In general, in one aspect, the invention relates to a method for forwarding packets. The method includes receiving, by a network element, a first encapsulated packet addressed to the network element, decapsulating the first encapsulated packet to obtain an inner packet comprising a final bridging destination address, identifying an intermediate routing destination address using the final bridging destination address, generating, by the network element, a second encapsulated packet comprising the inner packet and the intermediate routing destination address, and transmitting the second encapsulated packet.

In general, in one aspect, the invention relates to a method for forwarding packets. The method includes receiving, by a network element, an inner packet comprising a final bridging destination address, identifying an intermediate routing destination address using the final bridging destination address, generating, by the network element, an encapsulated packet comprising the inner packet and the intermediate routing destination address, and transmitting the encapsulated packet.

In general, in one aspect, the invention relates to a network element, comprising a processor, a plurality of ports, and a memory comprising instructions, which when executed by the processor perform a method, the method comprising receiving, at a first port of the plurality of ports, a first encapsulated packet addressed to the network element, decapsulating the first encapsulated packet to obtain an inner packet comprising a final bridging destination address, identifying an intermediate routing destination address using the final bridging destination address, generating a second encapsulated packet comprising the inner packet and the intermediate routing destination address, and transmitting, using a second port of the plurality of ports, the second encapsulated packet.

In general, in one aspect, the invention relates to a network element, comprising a processor, a plurality of ports, and a memory comprising instructions, which when executed by the processor perform a method, the method comprising receiving, at a first port of the plurality of ports, an inner packet comprising a final bridging destination address, identifying an intermediate routing destination address using the final bridging destination address, generating an encapsulated packet comprising the inner packet and the intermediate routing destination address, and transmitting, using a second port of the plurality of ports, the encapsulated packet.

In general, in one aspect, the invention relates to a method for forwarding packets. The method includes receiving, by a network element, a first encapsulated packet, decapsulating the first encapsulated packet to obtain an inner packet, determining that the inner packet is to be broadcasted, identifying, based on the determining, a plurality of final bridging destination addresses, identifying a plurality of intermediate routing destination addresses associated with the plurality of final bridging destination addresses, generating, by the network element, a plurality of second encapsulated packets, wherein each of the plurality of second encapsulated packets comprises the inner packet and one of the plurality of intermediate routing destination addresses, and transmitting the plurality of second encapsulated packets.

In general, in one aspect, the invention relates to a method for forwarding packets. The method includes receiving, by a network element, an encapsulated packet addressed to a second network element, identifying a final routing source address included in the encapsulated packet, replacing, using an intermediate routing source address, the final routing source address to obtain a rewritten encapsulated packet, and transmitting the rewritten encapsulated packet.

Other aspects of the invention will be apparent from the following description and the appended claims.

DETAILED DESCRIPTION

Figure 1:
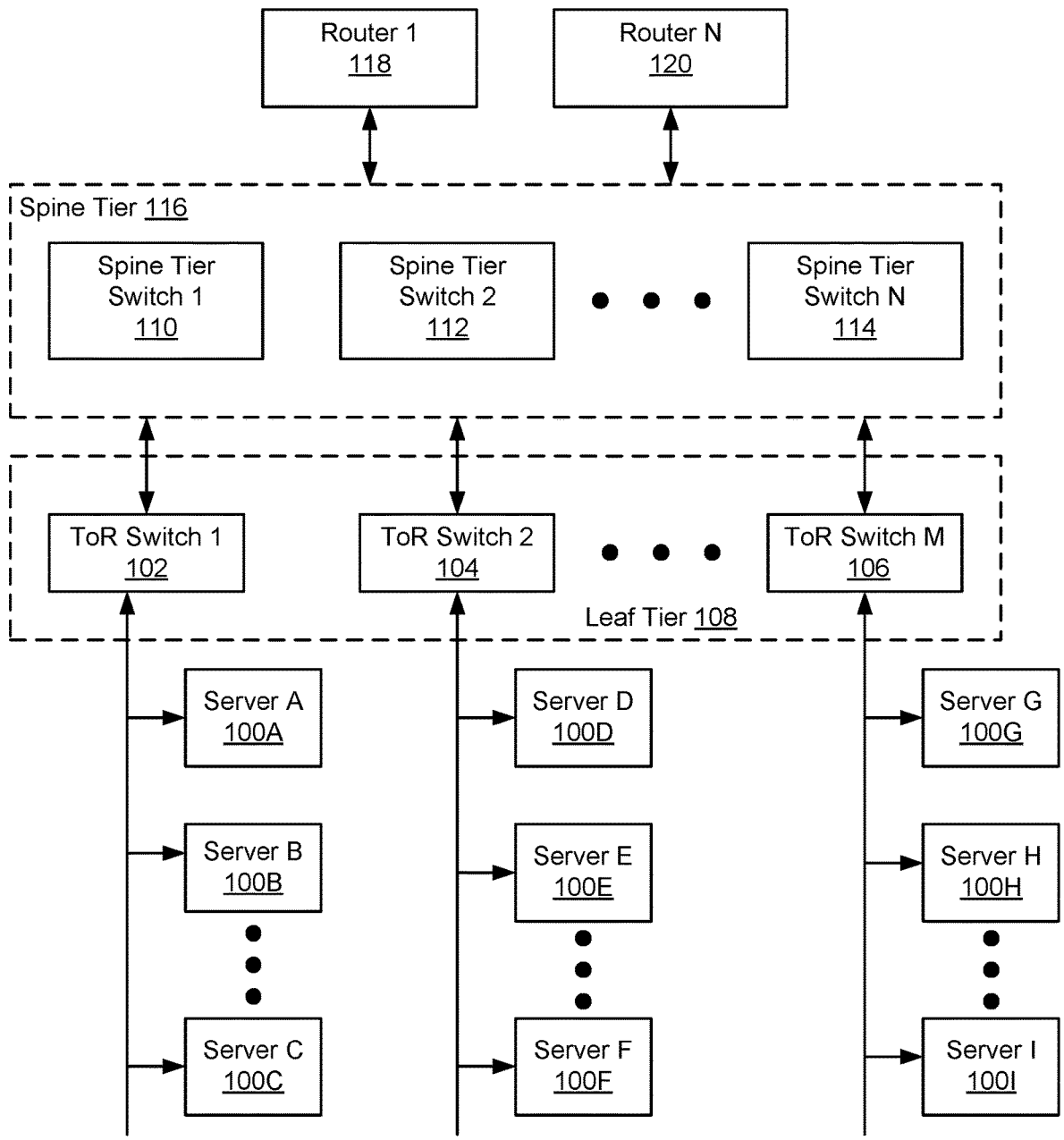
FIG. 1 shows a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one or ordinary skill in the art that the invention may be practiced without these specific details. In other instances, well-known features have not been described in detail to avoid unnecessarily complicating the description.

In the following description of FIGS. 1-7E, any component described with regard to a figure, in various embodiments of the invention, may be equivalent to one or more like-named components described with regard to any other figure. For brevity, descriptions of these components will not be repeated with regard to each figure. Thus each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiment described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method for transmitting MAC frames between hosts/remote machines and virtual machines across network elements (e.g., switches, routers, and multilayer switches) that conventionally do not hold capacity to address VXLAN encapsulation to any and all possible destination VTEPs within expanding data centers. More specifically, embodiments of the invention permit a network element the functionality of retaining VXLAN encapsulation table entries corresponding to VTEPs on Top of Rack (ToR) switches versus to VTEPs on hosts that reside under those ToR switches. This use of indirect VXLAN bridging may reduce the number of required VTEPs stored on a network element for the purposes of performing VXLAN encapsulation, thereby once again establishing the capability for packets to reach any arbitrary destination VTEP as data centers scale.

In one embodiment of the invention, indirect VXLAN bridging uses, at least in part, the VXLAN protocol. One version of the VXLAN protocol is defined in the document entitled "VXLAN: A Framework for Overlaying Virtualized Layer 2 Networks over Layer 3 Networks" version 09 dated August 2014. The VXLAN protocol is hereby incorporated by reference in its entirety. The invention is not limited to a particular version of VXLAN.

In the following description, all references to specific MAC addresses, e.g., ToR switch MAC, refer to a MAC address associated with a specific component in the system, e.g., a virtual machine, a server, a ToR switch, etc. but should not be interpreted to mean that such component only has one MAC address. Rather, in various embodiments of the invention, one or more of the aforementioned components may be associated with multiple MAC addresses.

In the following description, all references to specific IP addresses, e.g., destination VM IP, refer to an IP address associated with a specific component in the system, e.g., a virtual machine, a server, a ToR switch, etc. but should not be interpreted to mean that such components only has one such IP address. Rather, in various embodiments of the invention, one or more of the aforementioned components may be associated with multiple IP addresses.

FIG. 1 shows a system in accordance with one or more embodiments of the invention. The system includes one or more servers (100A-100I), a leaf tier (108), a spine tier (116), and one or more routers (118, 120). The leaf tier and the spine tier may be collectively referred to as the network fabric. In one embodiment of the invention, the network fabric may be implemented as an IP (or Layer-3) Fabric. Further, all the aforementioned components may be co-located in the same physical location. Alternatively, the aforementioned components may not all be co-located. Additional details regarding each of the aforementioned components are provided below.

In one embodiment of the invention, a server (also referred to as a host) (100A-100I) is a computer system. A computer system may include any type of physical system that is configured to generate, send, receive, and/or process MAC frames (see e.g., FIG. 4A-7E). In addition, each of the servers may include or be configured to execute one or more virtual tunnel end points (VTEP) VTEPs (see FIG. 3). The computer system may also include functionality to execute one or more virtual machines, where each virtual machine may be configured to generate, send, receive, and/or process MAC frames. In one embodiment of the invention, each virtual machine corresponds to an execution environment that is distinct from the execution environment provided by the server upon which it is executing. Examples of virtual machines include, but are not limited to, Oracle® VM and VMware® Virtual Server. (Oracle is a registered trademark of Oracle International Corporation and VMware is a registered trademark of VMware, Inc.). The computer system may include a processor, memory, and one or more physical network interfaces.

Each server is directly connected to at least one Top of Rack (ToR) switch (102, 104, 106) in the leaf tier (108). In one embodiment of the invention, each server is only directly connected to a single ToR switch in the leaf tier (108). In one embodiment of the invention, the ToR switches in a leaf tier (108) are not directly connected to each other. Alternatively, if the ToR switches implement Multichassis Link Aggregation (MLAG), then a given ToR switch may be directly connected to one other ToR switch in the leaf tier and a given server may be connected to each of the ToR switches in the MLAG domain. Each of the ToR switches may include or be configured to execute one or more virtual tunnel end points (VTEP) VTEPs (see FIG. 3).

Each ToR switch in the leaf tier (108) is connected to at least one spine switch (110, 112, 114) in the spine tier (116). In one embodiment of the invention, each ToR switch is connected to every other switch in the spine tier. Further, in one embodiment of the invention, the spine switches in the spine tier (116) are not directly connected to each other. Alternatively, if the spine switches implement Multichassis Link Aggregation (MLAG), then a given spine switch may be directly connected to one other spine switch in the spine tier.

In one embodiment of the invention, each leaf switch and each spine switch is a physical device that includes persistent storage, memory (e.g., Random Access Memory), one or more processors, and two or more physical ports. Each port may be connected to either: (i) a computer system (described above), or (ii) a network element (i.e., any device that is part of the network infrastructure such as a leaf switch, a spine switch, or a router). Each switch (leaf switch and spine switch) is configured to receive encapsulated packets (e.g., VXLAN frames) and/or inner packets (e.g., MAC frames) via the ports and, in one or more embodiments of the invention, determine whether to process the VXLAN frames and/or MAC frames in accordance with the methods described below in FIGS. 4A-4C and 6.

Figure 3:
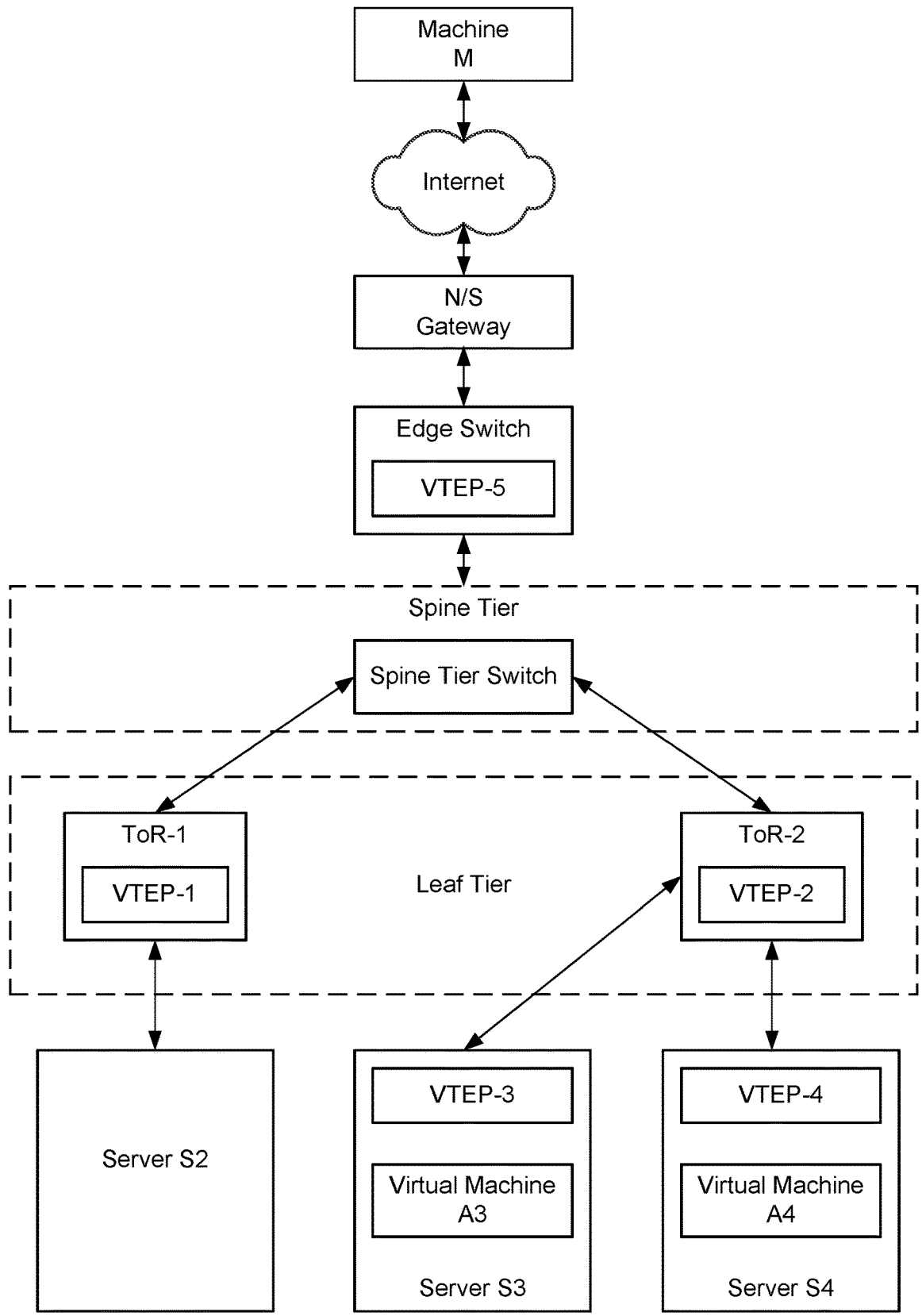
FIG. 3 shows an exemplary system in accordance with one or more embodiments of the invention.

Continuing discussion of FIG. 1, the spine switches may be directly connected to one or more routers (118, 120) or may be indirectly connected to one or more routers (see e.g., FIG. 3). In the latter scenario, the spine switches may be connected to one or more edge switches (not shown in FIG. 1) that, in turn, are directly-attached to one or more routers (118, 120).

In one embodiment of the invention, the routers (118, 120) are configured to receive MAC frames from other networks (e.g., the Internet) and route the MAC frames towards the appropriate server (100A-100I). In one embodiment of the invention, each router includes a number of physical ports (hereafter ports) and is configured to receive MAC frames via the ports and determine whether to (i) drop the MAC frame, or (ii) send the MAC frame out over another one of the ports on the switch. The router uses the destination Internet Protocol (IP) (or routing) address in the received MAC frame along with a routing table to determine out of which ports to send the MAC frame.

Figure 2:
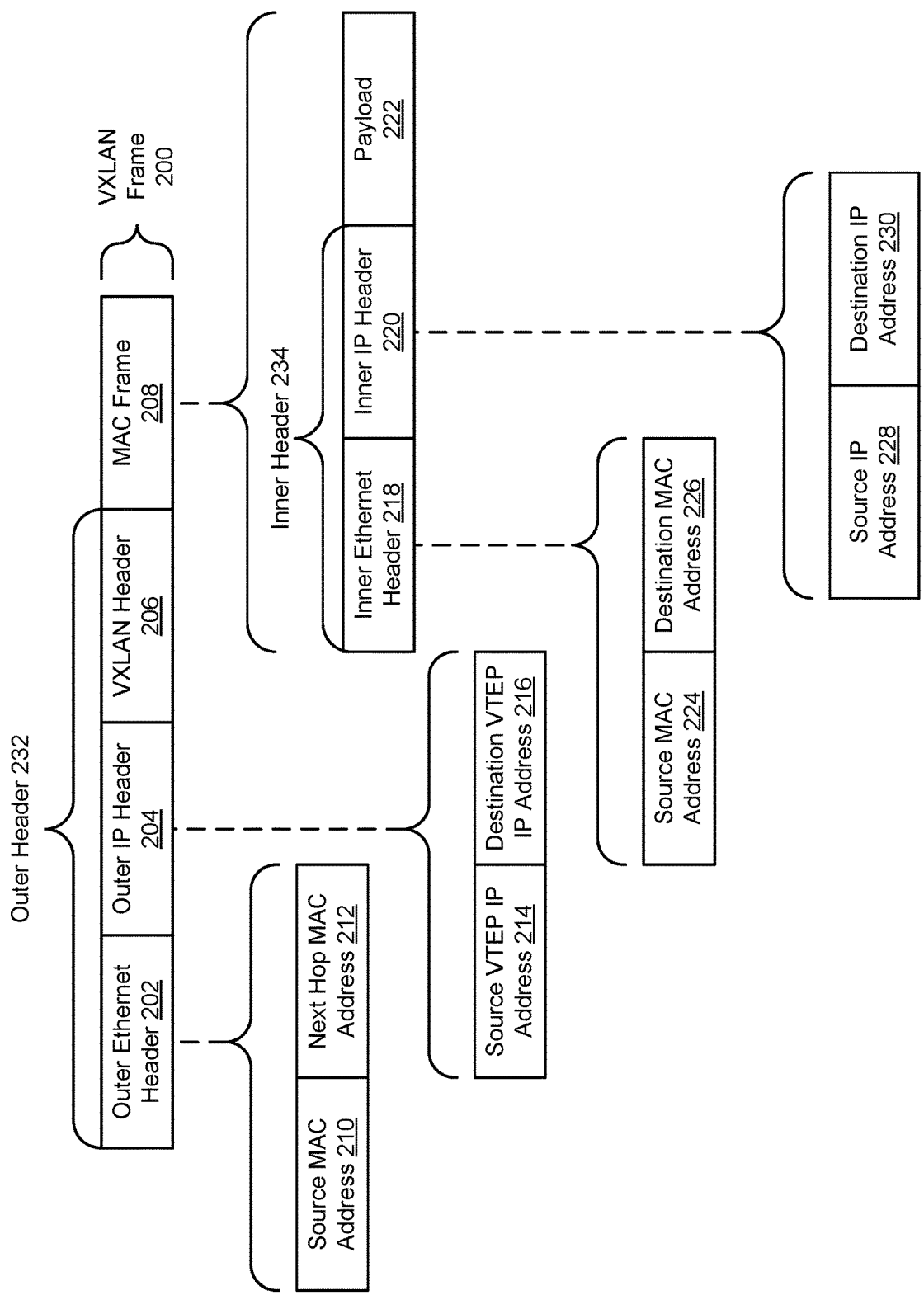
FIG. 2 shows a VXLAN frame in accordance with one or more embodiments of the invention.

FIG. 2 shows a VXLAN frame in accordance with one or more embodiments of the invention. The VXLAN frame (200) includes: (i) a MAC frame (208), (ii) a VXLAN header (206), (iii) an outer IP header (204), and (iv) and outer Ethernet header (202). Each of the aforementioned components is described below.

In one embodiment of the invention, the MAC frame (208) is generated by a source host or virtual machine and may include an inner header (234) and a payload (222). The payload (222) may include the content that the source host or virtual machine is attempting to transmit to the destination host or virtual machine. The inner IP header (220) includes a source IP (or routing) address (228) and a destination IP (or routing) address (230). The MAC frame may include other information/content without departing from the invention.

In one embodiment of the invention, the VXLAN header (206) may include, but is not limited to, a virtual network identifier (VNI). The VNI scopes the MAC frame (208) originated by the host or virtual machine such that the MAC frame (208) may only be received by destination servers or virtual machines associated (via a VTEP) with the same VNI. The VXLAN header may include other information/content without departing from the invention.

In one embodiment of the invention, the outer Ethernet header (202) and the outer IP header (204) are used to route the VXLAN frame from the source VTEP to the destination VTEP. To this end, the outer Ethernet header (202) includes the source MAC (or bridging) address (210) and the next hop MAC (or bridging) address (212), and the outer IP header (204) includes the source VTEP IP (or routing) address (214) and the destination VTEP IP (or routing) address (216). The aforementioned components may include other information/content without departing from the invention. The outer Ethernet header (202), the outer IP header (204), and the VXLAN header (206) may be collectively referred to as an outer header (232).

The VXLAN frame may include other components without departing from the invention.

FIG. 3 shows an exemplary system in accordance with one or more embodiments of the invention. The invention is not limited to the system shown in FIG. 3. Turning to FIG. 3, the system includes three servers (Servers S2-S4), where one (Server S2) is set in a bare metal configuration and the other two (Servers S3 and S4) each include one virtual machine and one VTEP. Specifically Server S3 includes virtual machine A3 and VTEP 3, and server S4 includes virtual machine A4 and VTEP 4.

In one embodiment of the invention, each server and virtual machine is associated with its own Internet Protocol (IP) address and its own media access control (MAC) address. Further, each VTEP on a server (e.g., Server S3) is associated with the IP address and MAC address of the server on which it is located. Further, each VTEP includes functionality to generate VXLAN (encapsulated) frames and process received VXLAN frames, in accordance with the VXLAN protocol, as described in FIGS. 4A-7E. Each VTEP may be implemented as a combination of software and store (volatile and/or persistent storage). Alternatively, each VTEP may be implemented as a combination of hardware and storage (volatile and/or persistent storage). In another alternative, each VTEP may be implemented as a combination of hardware and software.

Continuing with the discussion of FIG. 3, Server S2 is directly-attached to ToR Switch 1 and Servers S3-S4 are directly-attached to ToR Switch 2. In this example, each server is only connected to a single ToR switch. Each ToR switch (ToR Switch 1 and ToR Switch 2) includes a VTEP (VTEP 1 and VTEP 2). Each of the ToR switches is directly-attached to a spine switch in the spine tier. The Spine Tier Switch is, in turn, directly-attached to Edge Switch, where the edge switch includes a VTEP (VTEP 3). Subsequently, the edge switch is directly-attached to North/South Gateway; and finally, the north/south gateway and Machine M are operatively connected via the Internet. In one embodiment of the invention, each VTEP on a network switch (e.g., ToR Switch 1 or Edge Switch) is associated with the IP (or routing) address and MAC (or bridging) address of the network switch on which it is located. Further, all VTEPs in the exemplary system are associated with one VXLAN, henceforth one VNI.

The aforementioned system is used to describe various embodiments of the invention. Specifically, the aforementioned system is used to illustrate the different embodiments of indirect VXLAN bridging. However, the invention is not limited to the system shown in FIG. 3.

Figure 4A:
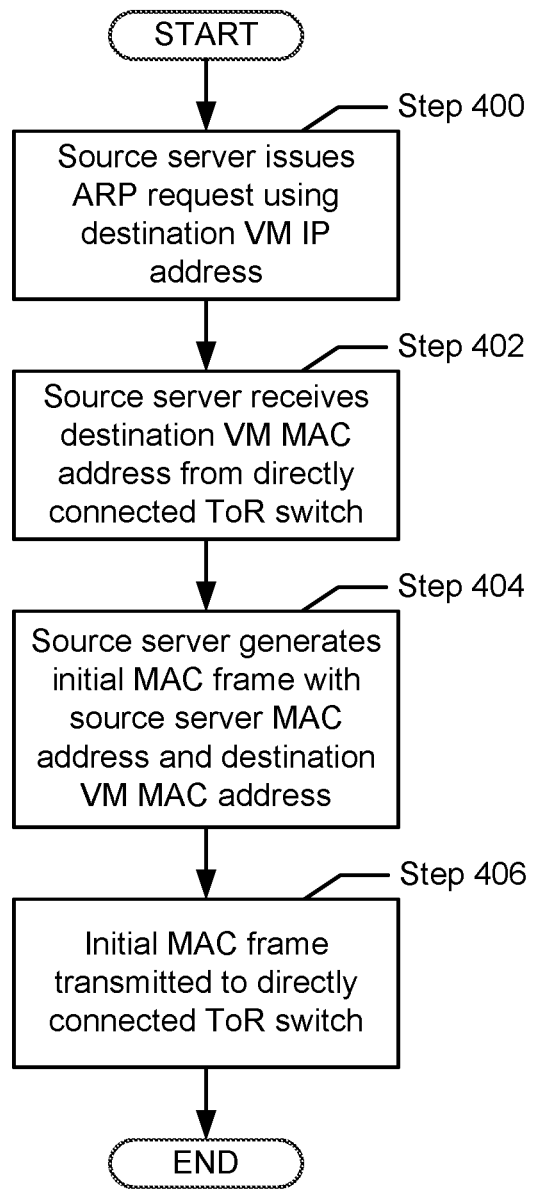
FIG. 4A shows a method for generating a MAC frame in accordance with one or more embodiments of the invention.
Figure 4B:
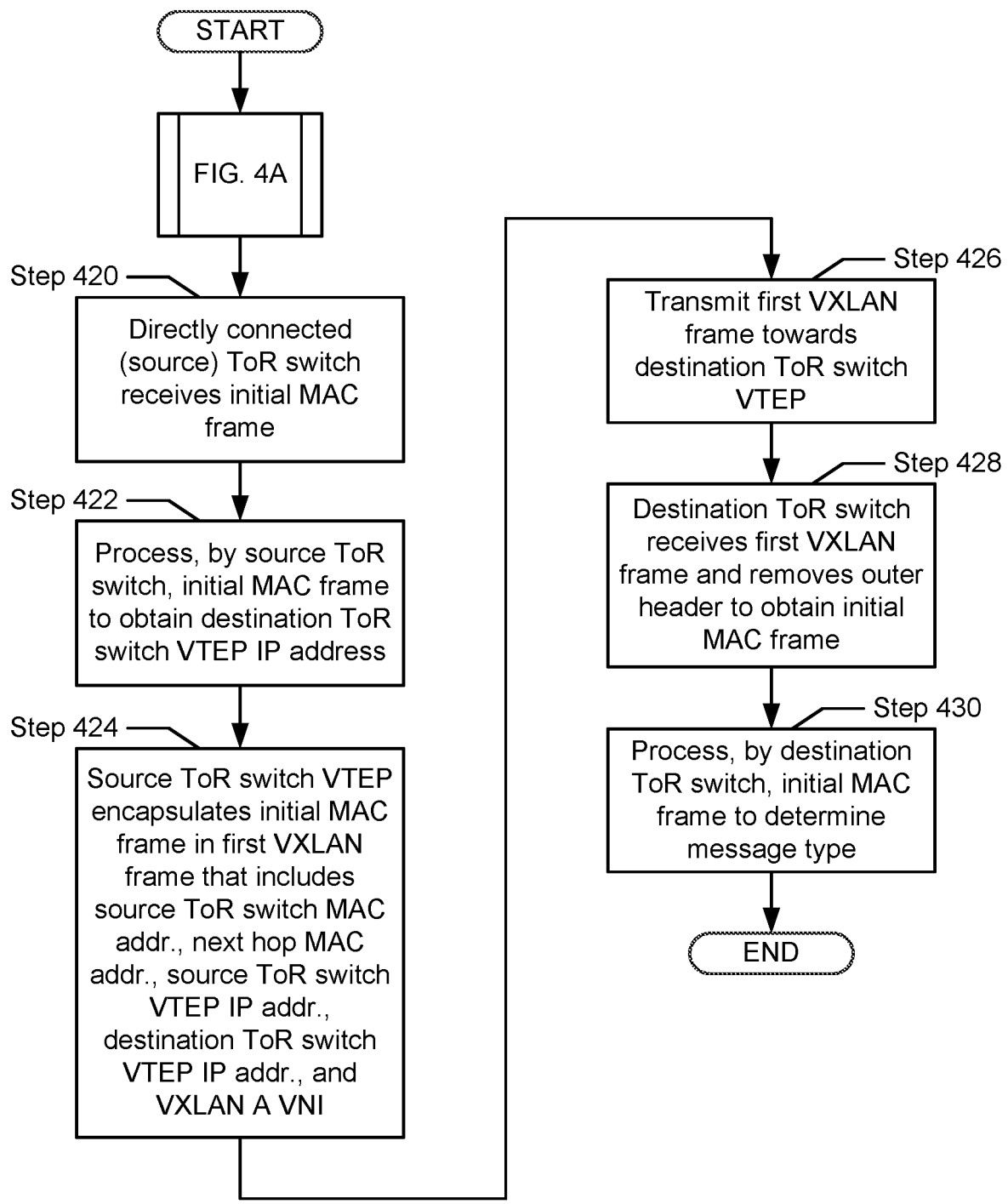
FIG. 4B shows a method for indirect VXLAN bridging in accordance with one or more embodiments of the invention.
Figure 4C:
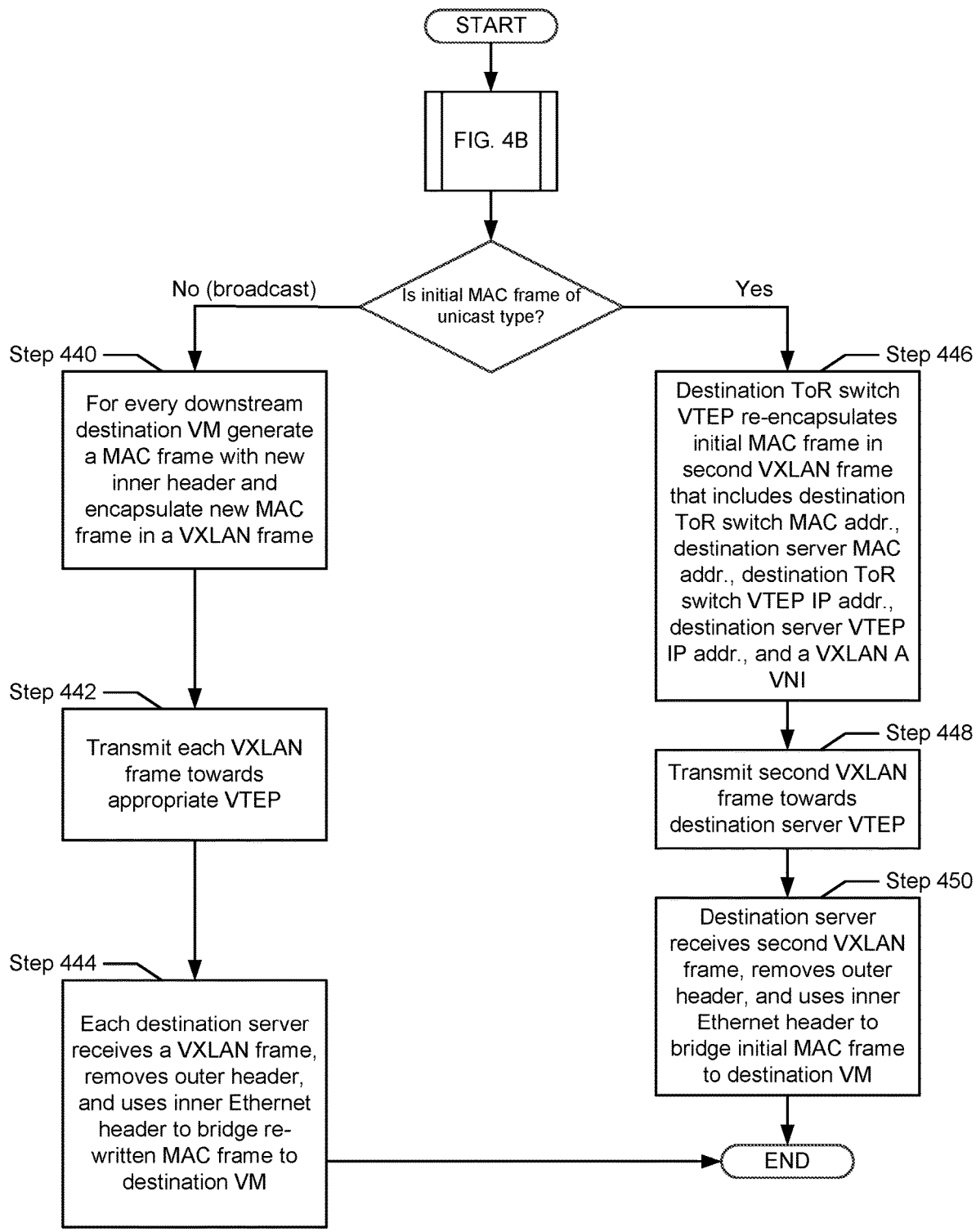
FIG. 4C shows a method for indirect VXLAN bridging in accordance with one or more embodiments of the invention.

FIGS. 4A-4C show flowcharts in accordance with one or more embodiments of the invention. While various steps in the flowcharts are presented and described sequentially, one of ordinary skill will appreciate that some or all of the steps may be executed in different orders, may be combined or omitted, and some or all of the steps may be executed in parallel. In one embodiment of the invention, the steps shown in FIGS. 4A-4C may be performed in parallel with other steps shown in FIGS. 6A-6B without departing from the invention.

Turning to FIGS. 4A-4C, FIGS. 4A-4C show a method for indirect VXLAN bridging in accordance with one or more embodiments of the invention. The following discussion on indirect VXLAN bridging is described in relation to the system in FIG. 3; however, embodiments of the invention are not limited to the system shown in FIG. 3.

The method shown in FIGS. 4A-4C describes indirect VXLAN bridging to reduce the required number of VTEP IP (or routing) addresses organized as the limited entries in the VXLAN encapsulation table on ToR Switch 1 (hereafter referred to as a source ToR switch) (associated with VXLAN A), therefore retaining communications between bare metal Server S2 (hereafter referred to as a source server) and virtual machine (VM) A3 (also referred to as a destination VM), in VXLAN A, within a data center with an overabundance of host VTEPs to address. From the perspective of bare metal Server S2, Server S2 is not aware of the VXLAN protocol or of any overlay routing mechanisms; rather, Server S2 operates as if it can communicate directly with VM A3 using conventional routing mechanisms.

In step 400, the source server issues an address resolution protocol (ARP) request using the Internet Protocol (IP) (or routing) address associated with the destination VM. A ToR switch implementing one or more embodiments of the invention (e.g., a ToR switch in the leaf tier (as discussed above)), receives the ARP request and subsequently generates an ARP response that includes the media access control (MAC) (or bridging) address associated with the destination VM. In one embodiment of the invention, the ToR switch that sent the ARP response is the ToR switch that is directly-attached to the source server.

In step 402, the source server receives the destination VM MAC address (e.g., final bridging destination address) (via the ARP response). In step 404, the source server generates an initial MAC frame (or inner packet) (unicast) that includes, at least, (i) the source server MAC (or bridging) address as the source MAC address, (ii) the destination VM MAC (or bridging) address as the destination MAC address, (iii) the source server IP (or routing) address as the source IP address, (iv) the destination VM IP address (e.g., final routing destination address) as the destination IP address, and (v) the payload. In one embodiment of the invention, if the initial MAC frame is a broadcast MAC frame (as opposed to a unicast MAC frame as described above), the initial MAC frame includes, at least, (i) the source server MAC address as the source MAC address, (ii) a broadcast MAC address (e.g., FF:FF:FF:FF:FF:FF) as the destination MAC address, (iii) the source server IP address as the source IP address, (iv) a broadcast IP address, and (v) the payload. Subsequently, in step 404, the initial MAC frame (generated in step 402) is transmitted to the ToR switch directly connected to the source server (hereafter referred to as a source ToR switch).

Referring to FIG. 4B, in step 420, the source ToR switch receives the initial MAC frame (which may be a unicast or a broadcast MAC frame). In step 422, the source ToR switch processes the initial MAC frame to obtain a virtual tunnel end point (VTEP) IP address (e.g., intermediate routing destination address) associated with the ToR switch (e.g., ToR Switch 2) directly-attached to the destination server (hereafter referred to as a destination ToR switch). The destination server (e.g., Server S3) is the server upon which the destination VM is executing. More specifically, the source ToR switch can ascertain the VTEP IP address necessary to reach the destination VM through any of a number of mechanisms. Examples include, but are not limited to, (i) distributed state management systems (or overlay controllers) such as VMware® NSX Controllers to disseminate information across network elements (e.g., switches, multilayer switches and routers); (ii) network protocols such as the Link Layer Discover Protocol (LLDP), which enables network elements functionality to share identity, capabilities, and neighbors with one another; (iii) static configurations; (iv) route policies; and (v) dynamic learning (discussed below). (VMware is a registered trademark of VMware, Inc.).

In one embodiment of the invention, the source ToR switch does not store information about all VTEPs (particularly, the potentially vast number of VTEPs executing on hosts) in the network; but rather, the source ToR switch may only store information about VTEPs executing on the other ToR switches in the IP Fabric. As such, fewer VXLAN encapsulation table entries are maintained on the source ToR switch while also retaining, if not increasing, the number of potential destinations that may be reached. In addition, the source ToR switch includes information necessary to determine the appropriate destination VTEP IP address (which is executing on the destination ToR switch) to use in the outer header of the VXLAN frame. In one embodiment of the invention, the source ToR switch may include a mapping between the destination VM IP address (e.g., final routing destination address) and the destination VTEP IP address (e.g., intermediate routing destination address). This mapping may be used for encapsulating unicast packets.

Continuing discussion of FIG. 4B, in step 424, the source ToR switch VTEP encapsulates the initial MAC frame (e.g., inner packet) within a first VXLAN frame (or encapsulated packet) (see e.g., FIG. 2). More specifically, the first VXLAN frame includes an outer header with the following information: the source ToR switch MAC (or bridging) address (as the source MAC address), the next hop MAC (or bridging) address (as the destination MAC address), the source ToR switch VTEP IP address (as the source IP address), the destination ToR switch VTEP IP address (e.g., intermediate routing address) (as the destination IP address), and VNI A (i.e., the VNI associated with VXLAN A). The destination IP address in the outer header corresponds to a destination for the first VXLAN frame (i.e., ToR Switch 2) that includes the VTEP that will decapsulate the first VXLAN frame generated in step 424. The destination IP address may be determined by using the destination VM IP address found in the inner IP header (see e.g., 220 in FIG. 2). Finally, VNI A is included in the VXLAN frame because both the source and destination ToR switches are associated with VNI A, and as such, VNI A is required to be included for the destination ToR switch to ultimately receive the initial MAC frame generated in step 404.

The above discussion of steps 422 and 424 corresponds to the processing of initial MAC frames that are unicast MAC frames. In one embodiment of the invention, if the initial MAC frame is a broadcast MAC frame, then the source ToR may send a copy of the initial MAC frame to every other ToR switch in the IP Fabric that is in the same subnet as the source VM. In such cases, a VXLAN frame is generated for each of the aforementioned ToR switches. More specifically, a VXLAN frame is generated for each ToR switch, where the destination VTEP IP address in each of the VXLAN frames corresponds to a VTEP on a ToR switch (see e.g., FIG. 3, VTEP-2). The selection of the appropriate destination VTEP IP address may be performed in a manner that is substantially similar to the process described in steps 422 and 424 above.

Continuing with the discussion of FIG. 4B, in step 426, the VXLAN frame generated in step 424, is transmitted, via the IP Fabric, towards the VTEP on the destination ToR switch. Step 426 may include the transmission of multiple VXLAN (encapsulated) frames in the event that the initial MAC frame is a unicast MAC frame. The VXLAN frame(s) is transmitted in accordance with standard IP routing mechanisms through the IP Fabric until it reaches the destination ToR switch. In the example shown in FIG. 3, the VXLAN frame is transmitted to the Spine Tier Switch from ToR Switch 1, and the Spine Tier Switch subsequently transmits the VXLAN frame to ToR Switch 2. Those skilled in the art will appreciate that the outer Ethernet header of the VXLAN frame is rewritten at each hop in the IP Fabric until the VXLAN frame reaches the destination ToR switch.

In step 428, the VTEP on the destination ToR switch receives the VXLAN frame and removes the outer header (see e.g., 232 in FIG. 2) to obtain the initial MAC frame (or inner packet) (generated in step 404). In one embodiment of the invention, the received VXLAN frame is trapped and decapsulated because the VXLAN frame includes the destination ToR switch MAC (or bridging) address as the destination MAC address in the outer Ethernet header, and includes the destination ToR switch VTEP IP address (e.g., intermediate routing destination address) as the destination IP address in the outer IP header.

In step 430, the destination ToR switch processes the initial MAC frame to determine the associated type (i.e., unicast, broadcast). More specifically, in one embodiment of the invention, the destination ToR switch determines the type of the initial MAC frame by examining the destination MAC address (see e.g., 226 in FIG. 2) in the inner header (234). In another embodiment, the type may be extracted from a bit in the VXLAN header (206) of the outer header (232) before decapsulation of the first VXLAN frame at the destination ToR switch.

Referring to FIG. 4C, if the initial MAC frame is a broadcast MAC frame, then in step 440, a MAC frame is created for each destination VM that is executing on a server that is directly connected to the ToR switch that received the VXLAN frame in step 428. Each of the aforementioned MAC frames includes a destination MAC address (e.g., final bridging destination address) corresponding to the destination VM and a destination IP address (e.g., final routing destination address) associated with the destination VM. The aforementioned MAC frames are then each encapsulated into a separate VXLAN frame. Each such VXLAN frame includes it is outer header: the ToR switch MAC address (as the source MAC address), a destination server MAC address (as the destination MAC address), the ToR switch VTEP IP address (as the source IP address), a destination server VTEP IP address (e.g., intermediate routing destination address) (as the destination IP address), and a VNI (which is the same VNI that was included in the VXLAN frame received by the ToR switch in step 428).

In step 442, each of the VXLAN frames generated in step 440, is transmitted towards a VTEP (associated with an intermediate routing destination address) on a destination server. In step 444, the VXLAN frames generated in step 440 are received by the VTEPs on the appropriate destination servers. Each destination server, at this point, then bridges (i.e., sends using the destination MAC address (e.g., final bridging destination address) in the MAC frame) the MAC frame that was encapsulated in the VXLAN frame received in step 444 to the appropriate destination VM executing on the destination server. Each destination VM subsequently processes the received MAC frame and extracts the payload.

Alternatively, referring to FIG. 4C, if the determination in step 430 has led to identification of the message as an unicast type, in step 446, the initial MAC frame received in the first VXLAN frame (in step 428) is re-encapsulated into a second VXLAN frame. The second VXLAN frame corresponds to the downstream VTEP associated with a singular destination server. More specifically, the second VXLAN frame includes an outer header with the following information: the source ToR switch MAC address (as the source MAC address), the destination server MAC address (as the destination MAC address), the source ToR switch VTEP IP address (as the source IP address), the destination server VTEP IP address (e.g., intermediate routing destination address) (as the destination IP address), and VNI A (i.e., the VNI associated with VXLAN A). The destination IP address in the outer header corresponds to the destination for the second VXLAN frame (e.g., Server S3) that includes the VTEP that will decapsulate the second VXLAN frame generated in step 446. The destination IP address may be determined by using the destination VM IP address found in the inner IP header (see e.g., 220 in FIG. 2). The VNI included in the second VXLAN frame is the same VNI included in the first VXLAN frame, implying the initial MAC frame is relayed using two tunnels on the same VXLAN via the destination ToR switch (i.e., ToR Switch 2). Finally, under the circumstances, VNI A is included in the second VXLAN frame because the ToR switches and the destination server are associated with VNI A, and as such, VNI A is required to be included for the destination server to ultimately receive the initial MAC frame generated in step 404.

In step 448, the second VXLAN frame generated in step 446, is transmitted towards the VTEP on the destination server. In step 450, the VTEP on the destination server receives the second VXLAN frame and removes the outer header (see e.g., 232 in FIG. 2) to obtain the initial MAC frame (generated in step 404). The destination server, at this point, then bridges (i.e., sends using the destination MAC address (e.g., final bridging destination address) in the MAC frame) the initial MAC frame to the destination VM (e.g., VM A3). The destination VM subsequently processes the initial MAC frame and extracts the payload.

In one embodiment of the invention, if the MAC frame is a broadcast MAC frame, then (as described above), the source ToR switch includes functionality to send a single broadcast MAC frame to each of the other ToR switches in the network fabric that includes a destination VM in the same subnet as the source VM. Each ToR switch in the set of ToR switches that receives a broadcast MAC frame (via VXLAN) subsequently generates a unicast MAC frame for each of the destination VMs that are executing on a server that is directly connected to the ToR switch, where each such VM is in the same subnet as the source VM. These unicast MAC frames are then individual sent to each of the destination VMs using VXLAN (as described above). The aforementioned embodiment may reduce the number of MAC frames that the source ToR switch is required to encapsulated in a VXLAN. Further, the aforementioned embodiment may also reduce the amount of East-West traffic in the IP fabric.

In another embodiment of the invention, if the MAC frame is a broadcast MAC frame, then (as described above), the source ToR switch includes functionality to generate unicast MAC frames for all destination VMs that are in the same subnet as the source VM. The source ToR switch may then process the unicast MAC frames as described above in FIGS. 4B-4C.

In one embodiment of the invention, though not explicitly shown in the exemplified system of FIG. 3, the source ToR switch (e.g., ToR Switch 1) may additionally, or alternatively, be directly-attached to a server (hereafter referred to as a second source server) that includes a VM and/or a VTEP (see e.g., Servers S3 and S4). In such an embodiment, upon generating an initial MAC frame, the second source server does not transmit the initial MAC frame to the source ToR switch (as does Server S3 in step 406 above). Instead, the VTEP executing on the second source server may: (i) first, process the initial MAC frame to obtain the destination ToR switch, or ToR Switch 2, VTEP IP address (see e.g., discussion with respect to step 422); (ii) encapsulate the initial MAC frame in a VXLAN frame with an outer header that includes at least the second source server VTEP IP address (e.g., final routing source address) (as the source IP address) and the obtained destination ToR switch VTEP IP address (e.g., intermediate routing destination address) (as the destination IP address); and subsequently, (iii) transmit the VXLAN frame through the network fabric towards the destination ToR switch.

Proceeding from here, in one embodiment of the invention, the VXLAN frame arrives initially at the source ToR switch—the first next hop along its journey across the network fabric. Conventionally, without the invention, the source ToR switch, at this point, having determined that the VXLAN frame is addressed to the destination ToR switch VTEP (e.g., VTEP-2), and not the VTEP executing on itself (e.g., VTEP-1), forwards the VXLAN frame towards a second next hop, which would ultimately land the VXLAN frame at the destination ToR switch VTEP. Considering indirect VXLAN bridging, however, in one embodiment of the invention, the source ToR switch VTEP traps and performs a modification to the VXLAN frame before forwarding the VXLAN frame onward as usual. More specifically, the source ToR switch VTEP modifies the source VTEP IP address (see e.g., 214 in FIG. 2) in the outer header of the VXLAN frame. Originally, in this example, the source VTEP IP address in the outer header is substantiated with information pertaining to the VTEP executing on the second source server (e.g., the final routing source address) because the VTEP executing on the second source server was the VTEP that first generated the VXLAN frame. Further to the modification nonetheless, in one embodiment of the invention, the source ToR switch VTEP replaces (or rewrites) the original source VTEP IP address (e.g., the VTEP IP address associated with the VTEP executing on the second source server) with the source ToR switch VTEP IP address (e.g., an intermediate routing source address).

In one embodiment of the invention, this aforementioned rewrite of the outer header of the VXLAN frame may be referred to as dynamic learning. Moreover, in performing this rewrite, in one embodiment of the invention, the source ToR switch subsequently informs elements of the network fabric that the source ToR switch VTEP IP address is necessary to reach the second source server VTEP IP address, and accordingly, a source VM that may be executing on the second source server. Further to providing this information, the source ToR switch reduces the number of VXLAN encapsulation table entries other ToR switches, such as the destination ToR switch, need to maintain.

Figure 5A:
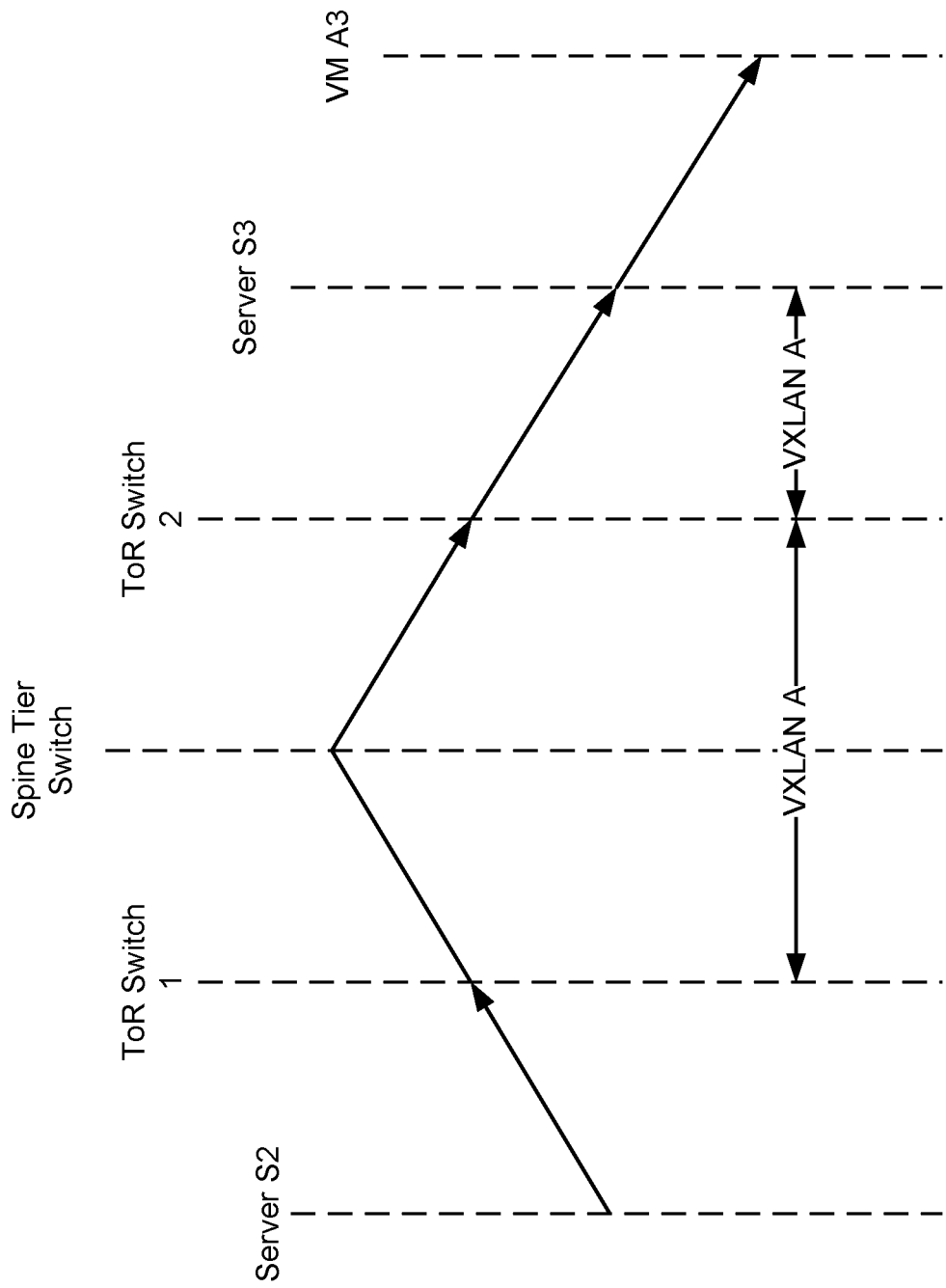
FIG. 5A shows an exemplary path of a payload transmitted using indirect VXLAN bridging in accordance with one or more embodiments of the invention.
Figure 5B:
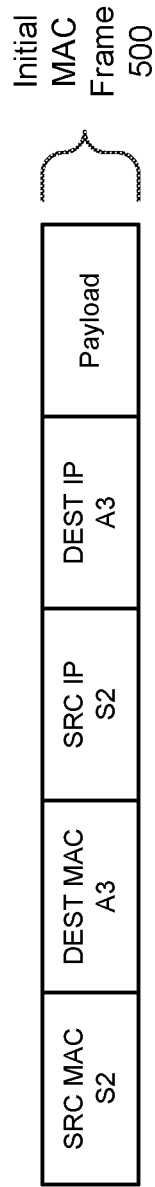
FIG. 5B shows an exemplary MAC frame in accordance with one or more embodiments of the invention.
Figure 5C:
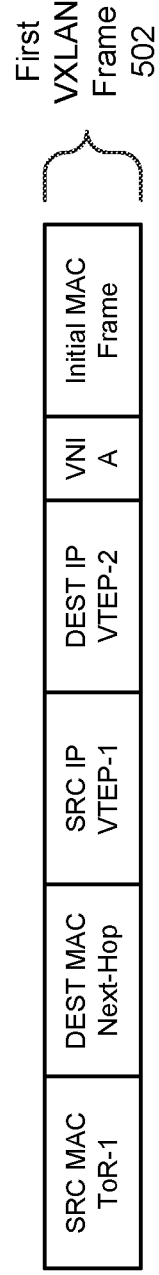
FIG. 5C shows an exemplary VXLAN frame in accordance with one or more embodiments of the invention.
Figure 5D:
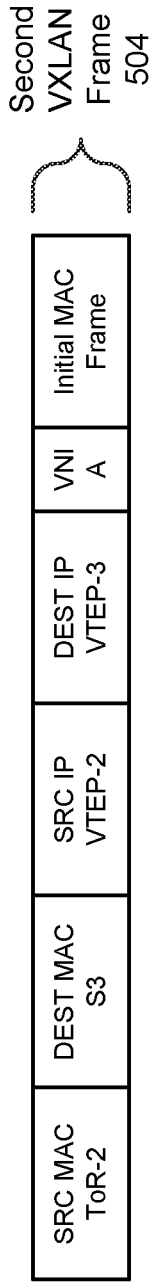
FIG. 5D shows an exemplary VXLAN frame in accordance with one or more embodiments of the invention.

FIG. 5A shows an exemplary path of a payload transmitted using indirect VXLAN bridging in accordance with one or more embodiments of the invention. More specifically, FIG. 5A shows an exemplary path the payload from bare metal Server S2 may take to reach VM A3. The exemplary path tracks the path described in FIGS. 4A-4C. The components shown in FIG. 5A correspond to like-named components in FIG. 3 and FIGS. 4A-4C. Turning to FIG. 5A, the initial MAC frame is generated in accordance with FIG. 4A. FIG. 5B shows an initial MAC frame (500) generated in accordance with FIG. 4A. Continuing with the discussion of FIG. 5A, at ToR Switch 1, the initial MAC frame is encapsulated in a first VXLAN frame (see FIG. 5C, 502) and transmitted towards ToR Switch 2. The first VXLAN frame is transmitted on VXLAN A. At ToR Switch 2, after the transmitting of the first VXLAN frame (see step 430 in FIG. 4B), it has been determined that the initial MAC frame is unicast MAC frame. Based on this determination, the initial MAC frame is re-encapsulated in a second VXLAN frame (see FIG. 5D, 504) and transmitted towards Server S3. The second VXLAN frame is also transmitted on VXLAN A. At Server S3, the initial MAC frame is subsequently bridged to VM A3.

Figure 6A:
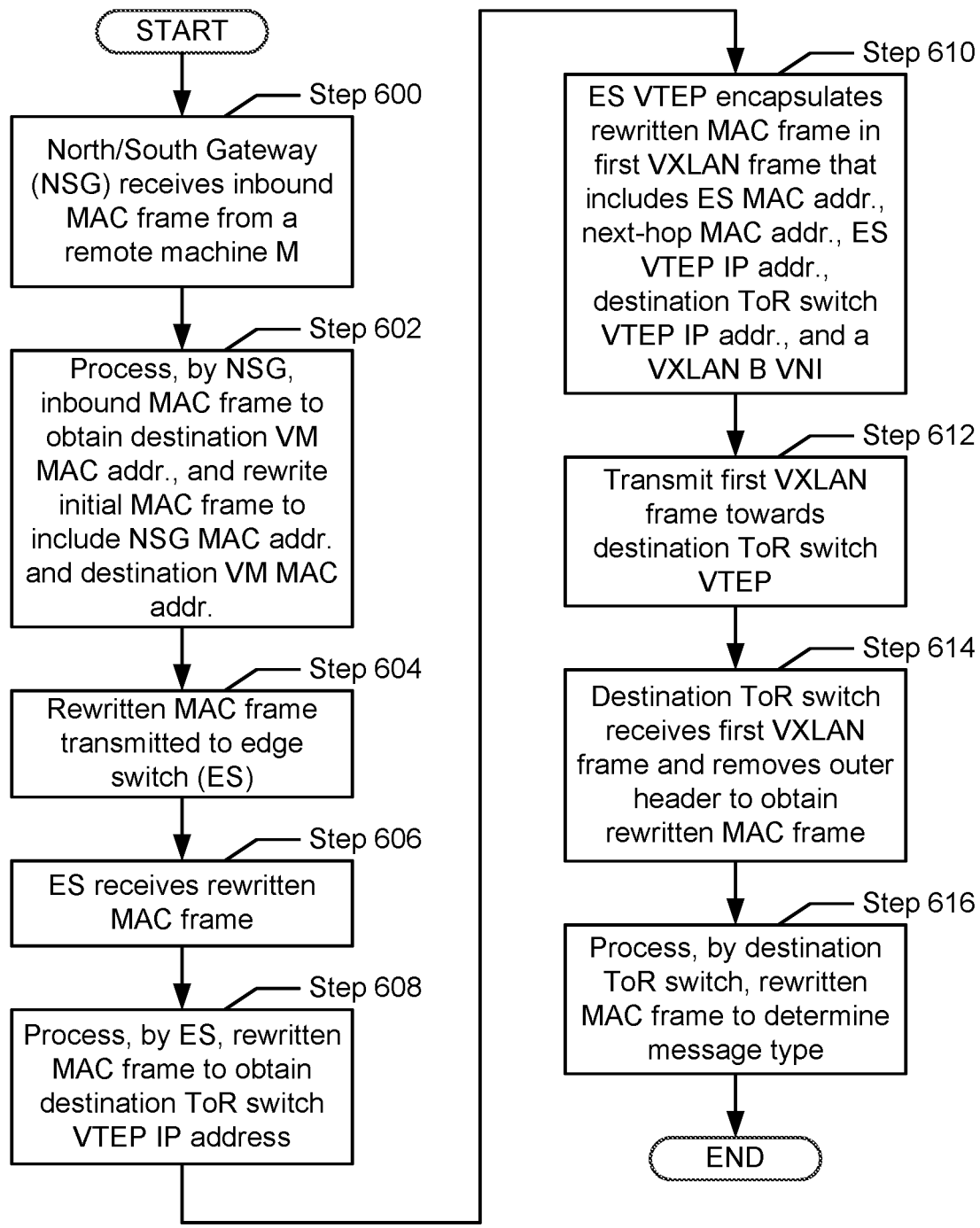
FIG. 6A shows a method for indirect VXLAN bridging in accordance with one or more embodiments of the invention.
Figure 6B:
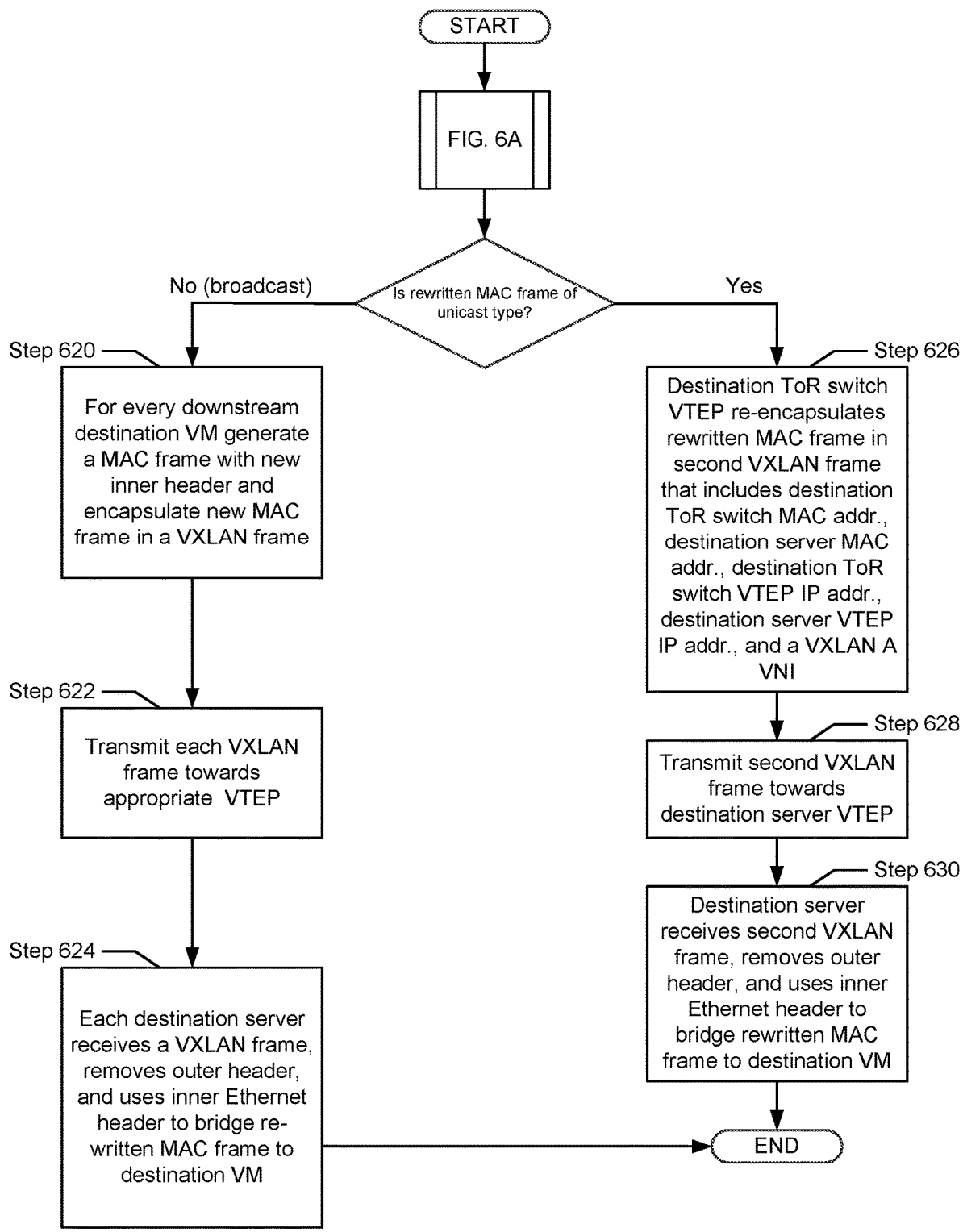
FIG. 6B shows a method for indirect VXLAN bridging in accordance with one or more embodiments of the invention.

FIG. 6A-6B show flowcharts in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel. In one embodiment of the invention, the steps shown in FIGS. 6A-6B may be performed in parallel with other steps shown in FIGS. 4A-4C without departing from the invention.

Turning to FIGS. 6A and 6B, FIGS. 6A and 6B show a method for indirect VXLAN bridging in accordance with one or more embodiments of the invention. The following discussion on indirect VXLAN bridging is described in relation to the system in FIG. 3; however, embodiments of the invention are not limited to the system shown in FIG. 3.

The method shown in FIGS. 6A-6B describes indirect VXLAN bridging to reduce the required number of VTEP IP addresses organized as the limited entries in the VXLAN encapsulation table on Edge (associated with VXLAN B), therefore retaining communications between a remote machine (i.e., Machine M) and virtual machine (VM) A4 (also referred to as a destination VM), in VXLAN B, within a data center with an overabundance of host VTEPs to address. From the perspective of Machine M, Machine M is not aware of the VXLAN protocol or of any overlay routing mechanisms; rather, Machine M operates as if it can communicate directly with VM A4 using conventional routing mechanisms.

In step 600, the North/South Gateway (NSG) receives an inbound MAC frame (unicast) from a remote machine (e.g., Machine M). The inbound MAC frame includes, at least, (i) the NSG MAC address as the destination MAC address, (ii) the remote machine IP address as the source IP address, (iii) the destination VM IP address (e.g., final routing destination address) as the destination VM address (see e.g., FIG. 7B), and (iv) the payload. In one embodiment of the invention, if the inbound MAC frame is a broadcast MAC frame (as opposed to a unicast MAC frame as described above), the inbound MAC frame includes, at least, (i) a broadcast MAC address (e.g., FF:FF:FF:FF:FF:FF) as the destination MAC address, (ii) the remote machine IP address as the source IP address, (iii) a broadcast IP address, and (iv) the payload. In step 602, the NSG processes the inbound MAC frame to obtain a rewritten MAC frame. More specifically, the NSG ascertains the destination VM MAC address (e.g., final bridging destination address) through any of a number of commonly available MAC address learning mechanisms.

Continuing with the discussion of FIG. 6A, in step 602, the inbound MAC frame received by the NSG, in step 600, as is the case for a unicast MAC frame, is rewritten to remove the NSG MAC address as the destination MAC address, and to replace it with the destination VM MAC address. In the case of a broadcast MAC frame, the broadcast MAC address, as the destination MAC address, remains intact. Further, the source MAC address in the inbound MAC frame may be replaced with the NSG MAC address (see e.g., FIG. 7C).

In step 604, The NSG then forwards the rewritten MAC frame to the edge switch. In step 606, the edge switch receives the rewritten MAC frame (which may be a unicast or a broadcast MAC frame) from the NSG; and in the following step (step 608), the edge switch processes the rewritten MAC frame to obtain the VTEP IP address associated with the ToR switch (e.g., ToR Switch 2) directly connected to a destination server (hereafter referred to as a destination ToR switch). The destination server is the server upon which the destination VM is executing. More specifically, the edge switch can attain the VTEP IP address necessary to reach the destination VM through any of a number of mechanisms. Examples include, but are not limited to, (i) distributed state management systems (or overlay controllers) such as VMware® NSX Controllers to disseminate information across network elements (e.g., switches, multilayer switches and routers); (ii) network protocols such as the Link Layer Discover Protocol (LLDP), which enables network elements functionality to share identity, capabilities, and neighbors with one another; (iii) static configurations; (iv) route policies; and (v) dynamic learning (discussed above). (VMware is a registered trademark of VMware, Inc.).

In one embodiment of the invention, the edge switch does not store information about all VTEPs in the network; but rather, the edge switch may only store information about VTEPs executing on the other ToR switches in the IP Fabric. As such, fewer VXLAN encapsulation table entries are maintained on the edge switch while retaining, if not increasing, the number of potential destinations that may be reached. In addition, the edge switch includes information necessary determining the appropriate destination VTEP IP address (e.g., intermediate routing destination address) (which is executing on the destination ToR switch) to use in the outer header of the VXLAN (encapsulated) frame. In one embodiment of the invention, the edge switch may include a mapping between the destination VM IP address and the destination VTEP IP address.

Continuing discussion of FIG. 6A, in step 610, the edge switch VTEP encapsulates the rewritten MAC frame within a VXLAN frame (see e.g., FIG. 2). More specifically, the VXLAN frame includes an outer header with the following information: the edge switch MAC address (as the source MAC address), the next hop MAC address (as the destination MAC address), the edge switch VTEP IP address (as the source IP address), the destination ToR switch VTEP IP address (e.g., the intermediate routing destination address) (as the destination IP address), and VNI B (i.e., the VNI associated with VXLAN B). The destination IP address in the outer header corresponds to a destination for the VXLAN frame (i.e., ToR Switch 2) that includes the VTEP that will decapsulate the VXLAN frame generated in step 610. The destination IP address may be determined by using the destination VM IP address found in the inner IP header (see e.g., 220 in FIG. 2). Finally, VNI B is included in the first VXLAN frame because both the edge and destination ToR switches are associated with VNI B, and as such, VNI B is required to be included for the destination ToR switch to ultimately receive the rewritten MAC frame generated in step 602.

The above discussion of steps 608 and 610 corresponds to the processing of rewritten MAC frames that are unicast MAC frames. In one embodiment of the invention, if the initial MAC frame is a broadcast MAC frame, then the edge switch may send a copy of the rewritten MAC frame to every other ToR switch in the network fabric that is in the same subnet as the remote machine. In such cases, a VXLAN frame is generated for each of the aforementioned ToR switches. More specifically, a VXLAN frame is generated for each ToR switch, where the destination VTEP IP address in each of the VXLAN frames corresponds to a VTEP on a ToR switch (see e.g., FIG. 3, VTEP-2). The selection of the appropriate destination VTEP IP address (e.g., intermediate routing destination address) may be performed in a manner that is substantially similar to the process described in steps 608 and 610 above.

Continuing with the discussion of FIG. 6A, in step 612, the VXLAN frame generated in step 610, is transmitted, via the IP Fabric, towards the VTEP on the destination ToR switch. Step 612 may include the transmission of multiple VXLAN frames in the event that the rewritten MAC frame is a unicast MAC frame. The VXLAN frame is transmitted in accordance with standard IP routing mechanisms through the IP Fabric until the VXLAN frame reaches the destination ToR switch. In the example shown in FIG. 3, the VXLAN frame is transmitted to the Spine Tier Switch from Edge Switch, and the Spine Tier Switch subsequently transmits the first VXLAN frame to ToR Switch 2. Those skilled in the art will appreciate that the outer Ethernet header of the first VXLAN frame is rewritten at each hop in the IP Fabric until the first VXLAN frame reaches the destination ToR switch.

In step 614, the VTEP on the destination ToR switch receives the first VXLAN frame and removes the outer header (see e.g., 232 in FIG. 2) to obtain the rewritten MAC frame (generated in step 602). In one embodiment of the invention, the received first VXLAN frame is trapped and decapsulated because the first VXLAN frame includes the destination ToR switch MAC address as the destination MAC address in the outer Ethernet header, and includes the destination ToR switch VTEP IP address (e.g., the intermediate routing destination address) as the destination IP address in the outer IP header. In step 616, the destination ToR switch processes the rewritten MAC frame to determine the associated type (i.e., unicast, broadcast). More specifically, in one embodiment of the invention, the destination ToR switch determines the type of the rewritten MAC frame by examining the destination MAC address (see e.g., 226 in FIG. 2) in the inner header (234). In another embodiment, the type may be extracted from a bit in the VXLAN header (206) of the outer header (232) before decapsulation of the first VXLAN frame at the destination ToR switch.

Referring to FIG. 6B, if the rewritten MAC frame is a broadcast MAC frame, then in step 620, a MAC frame is created for each destination VM that is executing on a server that is directly connected to the ToR switch that received the VXLAN frame in step 614. Each of the aforementioned MAC frames includes a destination MAC address (e.g., final bridging destination address) corresponding to the destination VM and a destination IP address (e.g., final routing destination address) associated with the destination VM. The aforementioned MAC frames are then each encapsulated into a separate VXLAN frame. Each such VXLAN frame includes in its outer header: the ToR switch MAC address (as the source MAC address), a destination server MAC address (as the destination MAC address), the ToR switch VTEP IP address (as the source IP address), a destination server VTEP IP address (e.g., intermediate routing destination address) (as the destination IP address), and a VNI (which is the same VNI that was included in the VXLAN frame received by the ToR switch in step 614). In step 622, each of the VXLAN frames generated in step 620, is transmitted towards a VTEP on a destination server. In step 624, the VXLAN frames generated in step 620 are received by the VTEPs on the appropriate destination servers. Each destination server, at this point, then bridges (i.e., sends using the destination MAC address in the MAC frame) the MAC frame that was encapsulated in the VXLAN frame received in step 624 to the appropriate destination VM executing on the destination server. Each destination VM subsequently processes the received MAC frame and extracts the payload.

Alternatively, referring to FIG. 6B, if the determination in step 616 has led to identification of the message as an unicast type, in step 626, the rewritten MAC frame received in the first VXLAN frame (in step 614) is re-encapsulated into a second VXLAN frame. The second VXLAN frame corresponds to the downstream VTEP associated with a singular destination server. More specifically, the second VXLAN frame includes an outer header with the following information: the source ToR switch MAC address (as the source MAC address), the destination server MAC address (as the destination MAC address), the source ToR switch VTEP IP address (as the source IP address), the destination server VTEP IP address (as the destination IP address), and VNI B (i.e., the VNI associated with VXLAN B). The destination IP address in the outer header corresponds to the destination for the second VXLAN frame (i.e., Server S4) that includes the VTEP that will decapsulate the second VXLAN frame generated in step 626. The destination IP address may be determined by using the destination VM IP address found in the inner IP header (see e.g., 220 in FIG. 2). The VNI included in the second VXLAN frame is the same VNI included in the first VXLAN frame, implying the rewritten MAC frame is relayed using two tunnels on the same VXLAN via the destination ToR switch (i.e., ToR Switch 2). Finally, under the circumstances, VNI B is included in the second VXLAN frame because the edge switch, the destination ToR switch, and the destination server are associated with VNI B, and as such, VNI B is required to be included for the destination server to ultimately receive the rewritten MAC frame generated in step 602.

In step 628, the second VXLAN frame generated in step 626, is transmitted towards the VTEP on the destination server. In step 630, the VTEP on the destination server receives the second VXLAN frame and removes the outer header (see e.g., 232 in FIG. 2) to obtain the rewritten MAC frame (generated in step 602). The destination server, at this point, then bridges (i.e., sends using the destination MAC address in the MAC frame) the rewritten MAC frame to the destination VM (i.e., VM A4). The destination VM subsequently processes the rewritten MAC frame and extracts the payload.

In one embodiment of the invention, if the MAC frame is a broadcast MAC frame, then (as described above), the edge switch includes functionality to send a single broadcast MAC frame to each of the other ToR switches in the IP fabric that includes a destination VM in the same subnet as the remote machine. Each ToR switch in the set of ToR switches that receives a broadcast MAC frame (via VXLAN) subsequently generates a unicast MAC frame for each of the destination VMs that are executing on a server that is directly-attached to the ToR switch, where each such VM is in the same subnet as the remote machine. These unicast MAC frames are then individual sent to each of the destination VMs using VXLAN (as described above). The aforementioned embodiment may reduce the number of MAC frames that the edge switch is required to encapsulated in a VXLAN. Further, the aforementioned embodiment may also reduce the amount of North-South traffic in the network fabric.

In another embodiment of the invention, if the MAC frame is a broadcast MAC frame, then (as described above), the edge switch includes functionality to generate unicast MAC frames for all destination VMs that are in the same subnet as the remote machine. The edge switch may then process the unicast MAC frames as described above in FIGS. 6A-6B.

Figure 7A:
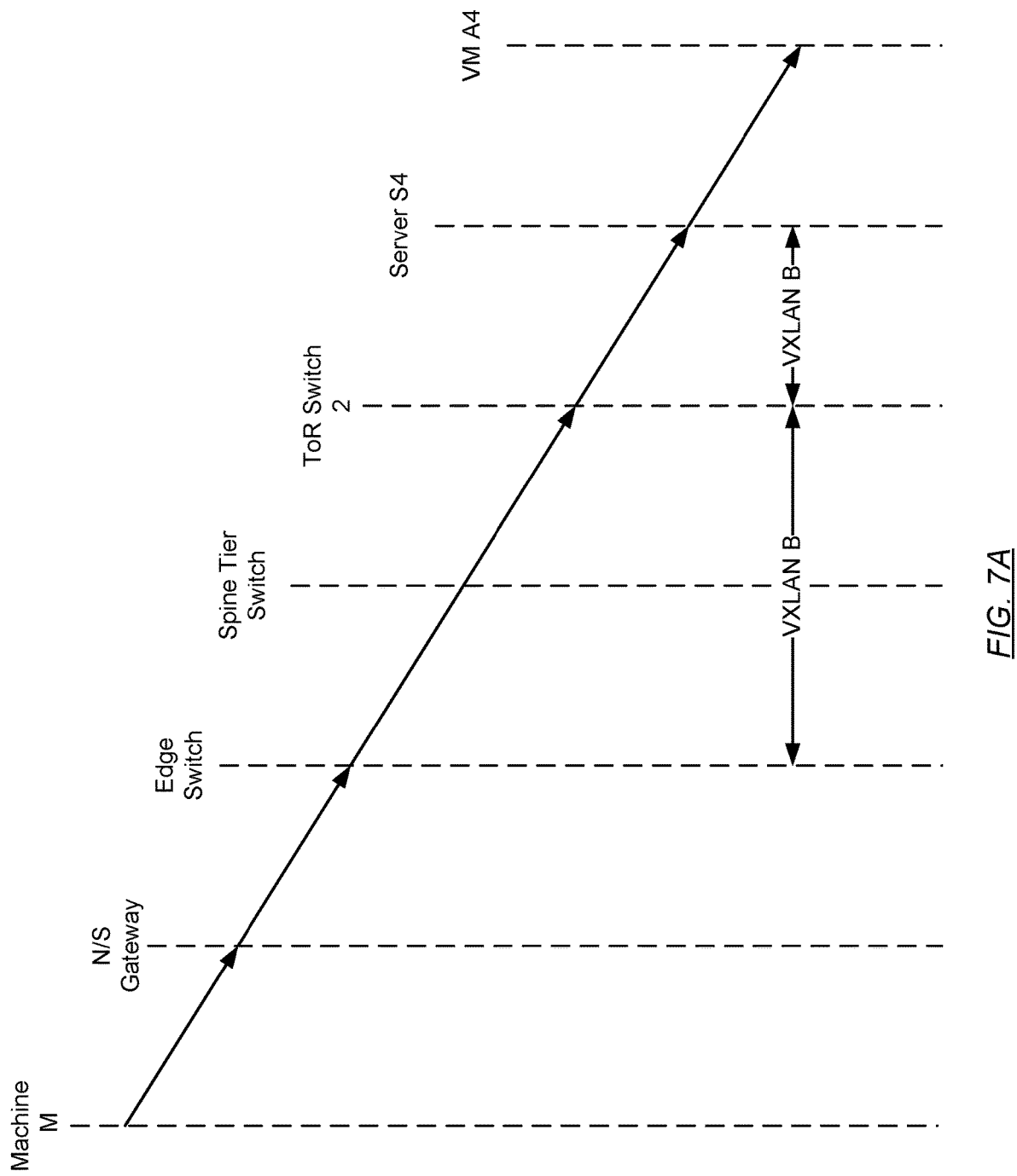
FIG. 7A shows an exemplary path of a payload transmitted using indirect VXLAN bridging in accordance with one or more embodiments of the invention.
Figure 7B:
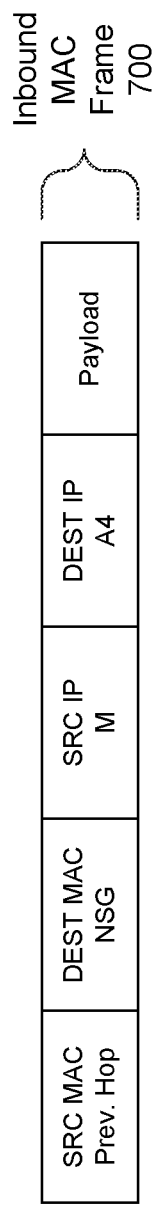
FIG. 7B shows an exemplary MAC frame in accordance with one or more embodiments of the invention.
Figure 7C:
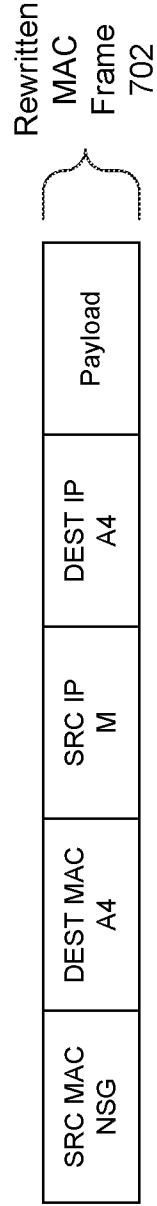
FIG. 7C shows an exemplary MAC frame in accordance with one or more embodiments of the invention.
Figure 7D:
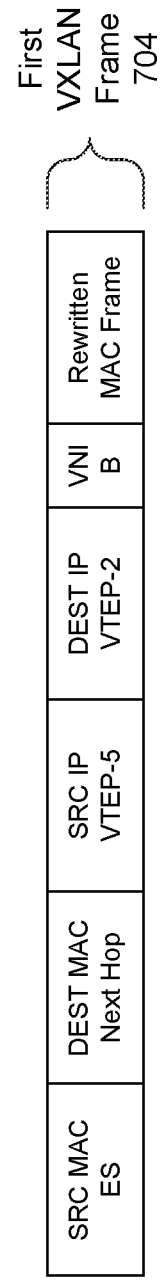
FIG. 7D shows an exemplary VXLAN frame in accordance with one or more embodiments of the invention.
Figure 7E:
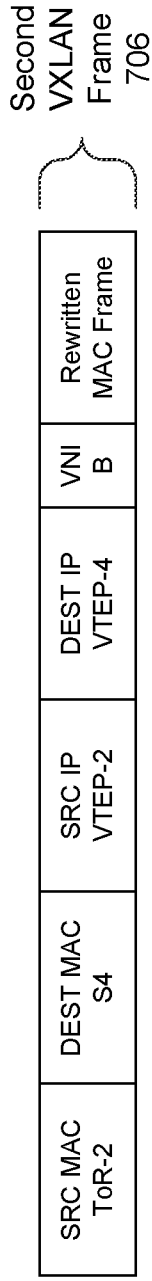
FIG. 7E shows an exemplary VXLAN frame in accordance with one or more embodiments of the invention.

FIG. 7A shows an exemplary path of a payload transmitted using indirect VXLAN bridging in accordance with one or more embodiments of the invention. More specifically, FIG. 7A shows an exemplary path the payload from Machine M may take to reach VM A4. The exemplary path tracks the path described in FIGS. 6A-6B. The components shown in FIG. 7A correspond to like-named components in FIG. 3 and FIGS. 6A-6B. Turning to FIG. 7A, at N/S Gateway, the inbound MAC frame (see FIG. 7B, 700) is modified into the rewritten MAC frame (see FIG. 7C, 702) and forwarded to Edge Switch. At Edge Switch, the rewritten MAC frame is encapsulated in a first VXLAN frame (see FIG. 7D, 704) and transmitted towards ToR Switch 2. The first VXLAN frame is transmitted on VXLAN B. At ToR Switch 2, after the transmitting of the first VXLAN frame (see step 616 in FIG. 6A), it has been determined that the rewritten MAC frame is representative of an unicast type. Based on this determination, the rewritten MAC frame is re-encapsulated in a second VXLAN frame (see FIG. 7E, 706) and transmitted towards Server S4. The second VXLAN frame is also transmitted on VXLAN B. At Server S4, the rewritten MAC frame is subsequently bridged to VM A4.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for forwarding packets, comprising:
    receiving, by a network element, a first encapsulated packet addressed to the network element, the first encapsulated packet comprising an inner packet comprising a final bridging destination address that identifies a destination device that is different from a source device from which the inner packet originated, wherein the network element is associated with a first virtual tunnel end point (VTEP), wherein the first VTEP is associated with a virtual network identifier (VNI), wherein the destination device is associated with a second VTEP, wherein the second VTEP is associated with the VNI, and wherein the first encapsulated packet originated from a third VTEP associated with a second network element, wherein the third VTEP is associated with the VNI;
    decapsulating, by the network element, the first encapsulated packet to obtain the inner packet;
    identifying, by the network element, an intermediate routing destination address using the final bridging destination address, wherein the intermediate routing destination address is associated with the second VTEP and the VNI;
    generating, by the network element, a second encapsulated packet comprising, the VNI, the inner packet and the intermediate routing destination address as a destination address in an outer header; and
    transmitting, by the network element, the second encapsulated packet, wherein the second encapsulated packet is decapsulated by the second VTEP.

2. The method of claim 1, wherein the network element is one selected from a group consisting of a switch, a router, and a multilayer switch.

3. The method of claim 1, wherein the first encapsulated packet is a virtual extensible local area network (VXLAN) frame.

4. The method of claim 1, wherein the final bridging destination address is a media access control (MAC) address.

5. The method of claim 4, wherein the MAC address is associated with a virtual machine (VM).

6. The method of claim 1, wherein the second VTEP is executing on a server.

7. The method of claim 6, wherein the server is directly attached to the network element.

8. The method of claim 1, further comprising:
prior to receiving the first encapsulated packet by the network element, receiving information specifying that the final bridging destination address is associated with the intermediate routing destination address.

9. A network element, comprising:
a processor;
a plurality of ports; and
a memory comprising instructions, which when executed by the processor perform a method, the method comprising:
receiving, at a first port of the plurality of ports, a first encapsulated packet addressed to the network element, the first encapsulated packet comprising an inner packet and a final bridging destination address that identifies a destination device that is different from a source device from which the inner packet originated, wherein the network element is associated with a first virtual tunnel end point (VTEP), wherein the first VTEP is associated with a virtual network identifier (VNI), wherein the destination device is associated with a second VTEP, wherein the second VTEP is associated with the VNI, and wherein the first encapsulated packet originated from a third VTEP associated with a second network element, wherein the third VTEP is associated with the VNI;
decapsulating by the network element, the first encapsulated packet to obtain the inner packet;
identifying, by the network element, an intermediate routing destination address using the final bridging destination address, wherein the intermediate routing destination address is associated with the second VTEP and the VNI;
generating, by the network element, a second encapsulated packet comprising, the VNI, the inner packet and the intermediate routing destination address as a destination address in an outer header; and
transmitting, by the network element, using a second port of the plurality of ports, the second encapsulated packet, wherein the second encapsulated packet is decapsulated by the second VTEP.

10. The network element of claim 9, wherein the network element is one selected from a group consisting of a switch, a router, and a multilayer switch.

11. The network element of claim 9, wherein the first encapsulated packet is a virtual extensible local area network (VXLAN) frame.

12. The network element of claim 9, wherein the final bridging destination address is a media access control (MAC) address.

13. The network element of claim 12, wherein the MAC address is associated with a virtual machine (VM).

14. The network element of claim 9, wherein the network element is directly attached to a server and wherein the second VTEP is executing on the server.

15. The network element of claim 9, wherein the method further comprises:
prior to receiving the first encapsulated packet by the network element, receiving information specifying that the final bridging destination address is associated with the intermediate routing destination address.

16. A method for forwarding packets, comprising:
receiving, by a network element associated with a first virtual tunnel end point (VTEP), a first encapsulated packet associated with a third VTEP, comprising an inner packet comprising a broadcast address that is associated with at least one destination device that is different from a source device from which the inner packet originated, wherein the at least one destination device is associated with a second VTEP, wherein the first, second, and third VTEP are associated with a same virtual network identifier (VNI);
decapsulating, by the network element, the first encapsulated packet to obtain the inner packet;
determining, by the network element, that the inner packet is to be broadcasted based on the broadcast address;
identifying, by the network element, based on the determining, a plurality of final bridging destination addresses;
identifying, by the network element, a plurality of intermediate routing destination addresses associated with the plurality of final bridging destination addresses;
generating, by the network element, a plurality of second encapsulated packets, wherein each of the plurality of second encapsulated packets comprises the inner packet and one of the plurality of intermediate routing destination addresses as a destination address in an outer header; and
transmitting, by the network element, the plurality of second encapsulated packets.

* * * * *